United States Patent
Iyer et al.

(10) Patent No.: US 11,029,771 B1
(45) Date of Patent: Jun. 8, 2021

(54) MANAGING PERIPHERALS OF A DUAL-BODY INFORMATION HANDLING SYSTEM

(71) Applicant: Dell Products L.P., Round Rock, TX (US)

(72) Inventors: Vivek Viswanathan Iyer, Austin, TX (US); Karthikeyan Krishnakumar, Austin, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 16/744,658

(22) Filed: Jan. 16, 2020

(51) Int. Cl.
*G06F 3/038* (2013.01)
*G06F 3/0354* (2013.01)
(Continued)

(52) U.S. Cl.
CPC ............ *G06F 3/038* (2013.01); *G06F 1/1681* (2013.01); *G06F 3/023* (2013.01);
(Continued)

(58) Field of Classification Search
CPC .... G06F 3/038; G06F 1/1681; G06F 3/03543; G06F 3/03545; G06F 3/03547;
(Continued)

(56) References Cited

U.S. PATENT DOCUMENTS

| 2005/0128968 A1* | 6/2005 | Yang | H04W 48/16 370/312 |
| 2009/0244012 A1* | 10/2009 | Behar | G06F 1/1616 345/169 |

(Continued)

OTHER PUBLICATIONS

Change Display Settings A Function, Dec. 5, 2018, Retrieved from url: https://docs.microsoft.com/en-us/windows/win32/api/winuser/nf-winuser-changedisplaysettingsa, Dec. 5, 2018.
(Continued)

*Primary Examiner* — Sahlu Okebato
(74) *Attorney, Agent, or Firm* — Baker Botts L.L.P.

(57) ABSTRACT

A system and method for managing peripherals of an information handling system, including performing, at a first time, a calibration and configuration of a peripheral management model, including: identifying contextual data associated with contextual inputs to the information handling system, the contextual data including i) a hinge angle of the information handling system and ii) a posture mode of the information handling system; training, based on the contextual data, the peripheral management model, including generating a configuration policy including configuration rules, the configuration rules for performing computer-implemented actions to automatically adjust settings of a peripheral of the information handling system without user interaction; performing, at a second time, a steady-state monitoring of the information handling system, including: applying the configuration rules to perform the computer-implemented actions to automatically adjust settings of the peripheral of the information handling system without user interaction.

9 Claims, 7 Drawing Sheets

(51) Int. Cl.
*G06F 3/0488* (2013.01)
*G06F 3/023* (2006.01)
*G06F 1/16* (2006.01)
*G06N 20/00* (2019.01)

(52) U.S. Cl.
CPC ...... *G06F 3/03543* (2013.01); *G06F 3/03545* (2013.01); *G06F 3/03547* (2013.01); *G06F 3/04886* (2013.01); *G06F 2203/0384* (2013.01); *G06N 20/00* (2019.01)

(58) Field of Classification Search
CPC ................ G06F 3/04886; G06F 3/023; G06F 2203/0384; G06N 20/00
See application file for complete search history.

(56) References Cited

U.S. PATENT DOCUMENTS

| | | | |
|---|---|---|---|
| 2014/0118312 A1* | 5/2014 | Oyama | G06F 3/038 345/179 |
| 2017/0123748 A1* | 5/2017 | Kim | G06F 3/1423 |
| 2020/0234177 A1* | 7/2020 | Matcha | G06F 16/2456 |

OTHER PUBLICATIONS

Set Sys Colors function, Dec. 5, 2018; Retrieved from url: https://docs.microsoft.com/en-us/windows/win32/api/winuser/nf-winuser-setsyscolors, Dec. 5, 2018.

User Preference Category Enum, Retrieve from url: https://docs.microsoft.com/en-us/dotnet/api/microsoft.win32.userpreferencecategory?view=netframework-4.7.2, Retrieved on Apr. 21, 2020.

\* cited by examiner

MANAGING PERIPHERALS OF A DUAL-BODY INFORMATION HANDLING SYSTEM

BACKGROUND

Field of the Disclosure

The disclosure relates generally to an information handling system, and in particular, managing peripherals of a dual-body information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Immersive productivity focuses on creating an immersive environment that allows a user of an information handling system to stay in his/her work flow. The creation of the immersive environment centers on the elimination of external distractions, providing assistance to the user on key tasks, and augmented capabilities to improve productivity. The elimination of distractions includes blocking interruptions such as notifications and alerts, as well as providing indications such as do-not-disturb to other parties. Assistance to the user includes contextually-driven actions and performance enhancements based on the users' current tasks.

SUMMARY

Innovative aspects of the subject matter described in this specification may be embodied in a method for managing peripherals of a dual-body information handling system, including performing, at a first time, a calibration and configuration of a peripheral management model, including: identifying contextual data associated with contextual inputs to the information handling system, the contextual data including i) a hinge angle of the dual-body information handling system and ii) a posture mode of the dual-body information handling system; training, based on the contextual data, the peripheral management model, including generating a configuration policy including configuration rules, the configuration rules for performing computer-implemented actions to automatically adjust one or more settings of a peripheral of the dual-body information handling system without user interaction; performing, at a second time, a steady-state monitoring of the dual-body information handling system, including: monitoring the contextual inputs of the dual-body information handling system; and in response to monitoring the contextual inputs of the dual-body information handling system, i) accessing the peripheral management model including the configuration policy, ii) identifying one or more of the configuration rules based on the monitored parameters associated with the contextual inputs, and iii) applying the one or more configuration rules to perform one or more of the computer-implemented actions to automatically adjust one or more settings of the peripheral of the dual-body information handling system without user interaction.

Other embodiments of these aspects include corresponding systems, apparatus, and computer programs, configured to perform the actions of the methods, encoded on computer storage devices.

These and other embodiments may each optionally include one or more of the following features. For instance, identifying the contextual data includes identifying the posture mode of the dual-body information handling system from a table-top posture mode, a book posture mode, and a tent posture mode. The peripheral includes a wireless stylus, and applying the one or more configuration rules to perform one or more of the computer-implemented actions to automatically adjust one or more settings of the peripheral of the dual-body information handling system includes adjusting one or more of a line width, an inking color, and a stylus friction of the wireless stylus. The peripheral includes an on-screen keyboard, and applying the one or more configuration rules to perform one or more of the computer-implemented actions to automatically adjust one or more settings of the peripheral of the dual-body information handling system includes adjusting a key width, a key distance, a language, and interface elements of the on-screen keyboard. The peripheral includes an integrated touchpad, and applying the one or more configuration rules to perform one or more of the computer-implemented actions to automatically adjust one or more settings of the peripheral of the dual-body information handling system includes adjusting a touch sensitivity, a scroll sensitivity, and a mapping of physical inputs of the integrated touchpad. The peripheral includes a digital touchpad, and applying the one or more configuration rules to perform one or more of the computer-implemented actions to automatically adjust one or more settings of the peripheral of the dual-body information handling system includes adjusting a touch sensitivity, a scroll sensitivity, and a mapping of digital inputs of the digital touchpad. The peripheral includes a printer, and applying the one or more configuration rules to perform one or more of the computer-implemented actions to automatically adjust one or more settings of the peripheral of the dual-body information handling system includes adjusting printer settings of the printer. The peripheral includes an external mouse, and applying the one or more configuration rules to perform one or more of the computer-implemented actions to automatically adjust one or more settings of the peripheral of the dual-body information handling system includes adjusting a sensitivity, a scrolling speed, and a mapping of physical inputs of the mouse. The peripheral includes an external keyboard, and applying the one or more configuration rules to perform one or more of the computer-implemented actions to automatically adjust one or more settings of the peripheral of the dual-body information handling system includes adjusting a travel distance of keys, and a sensitivity of the keys of the keyboard.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR
EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-7 wherein like numbers are used to indicate like and corresponding parts.

Figure 1:
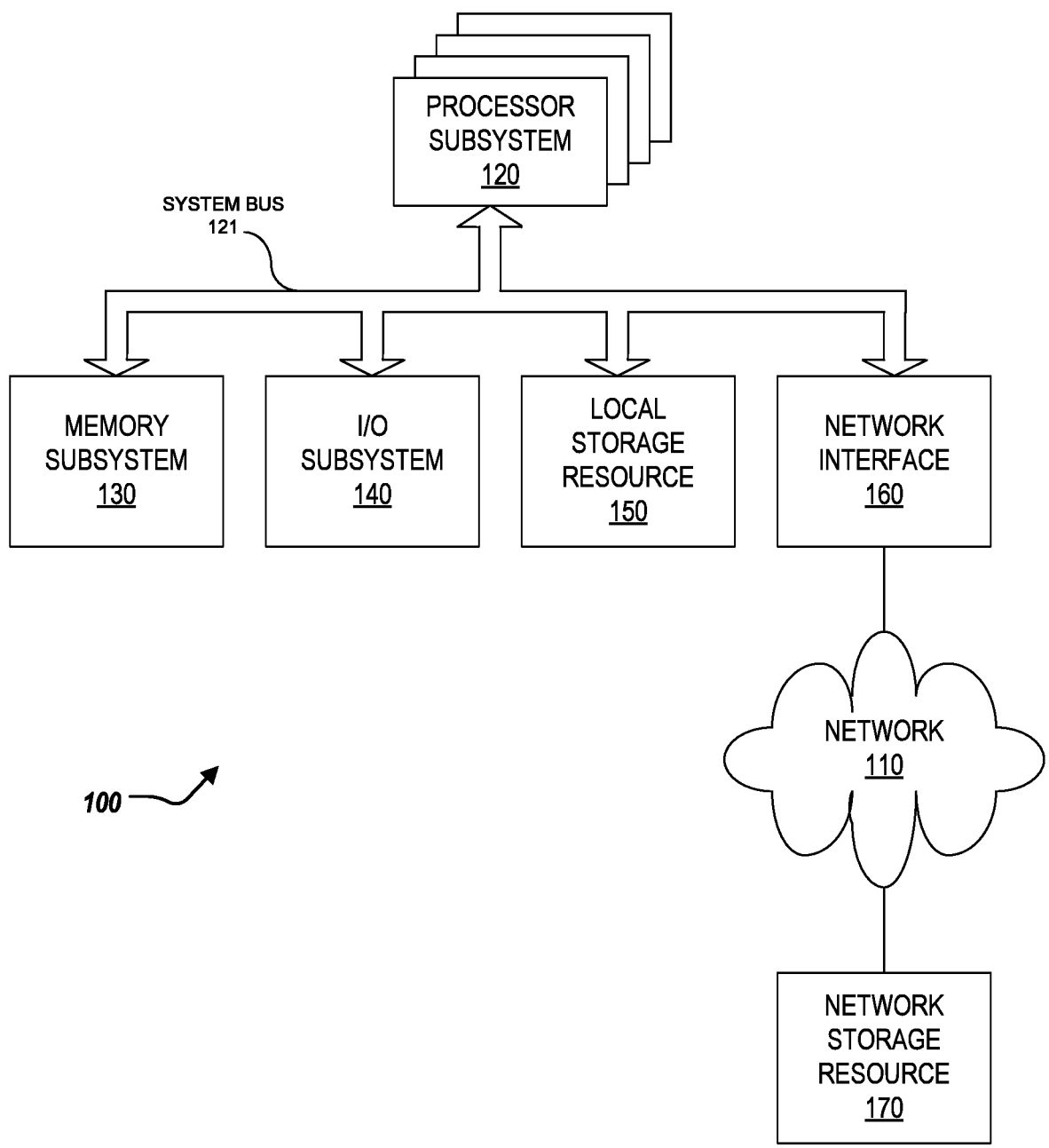
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
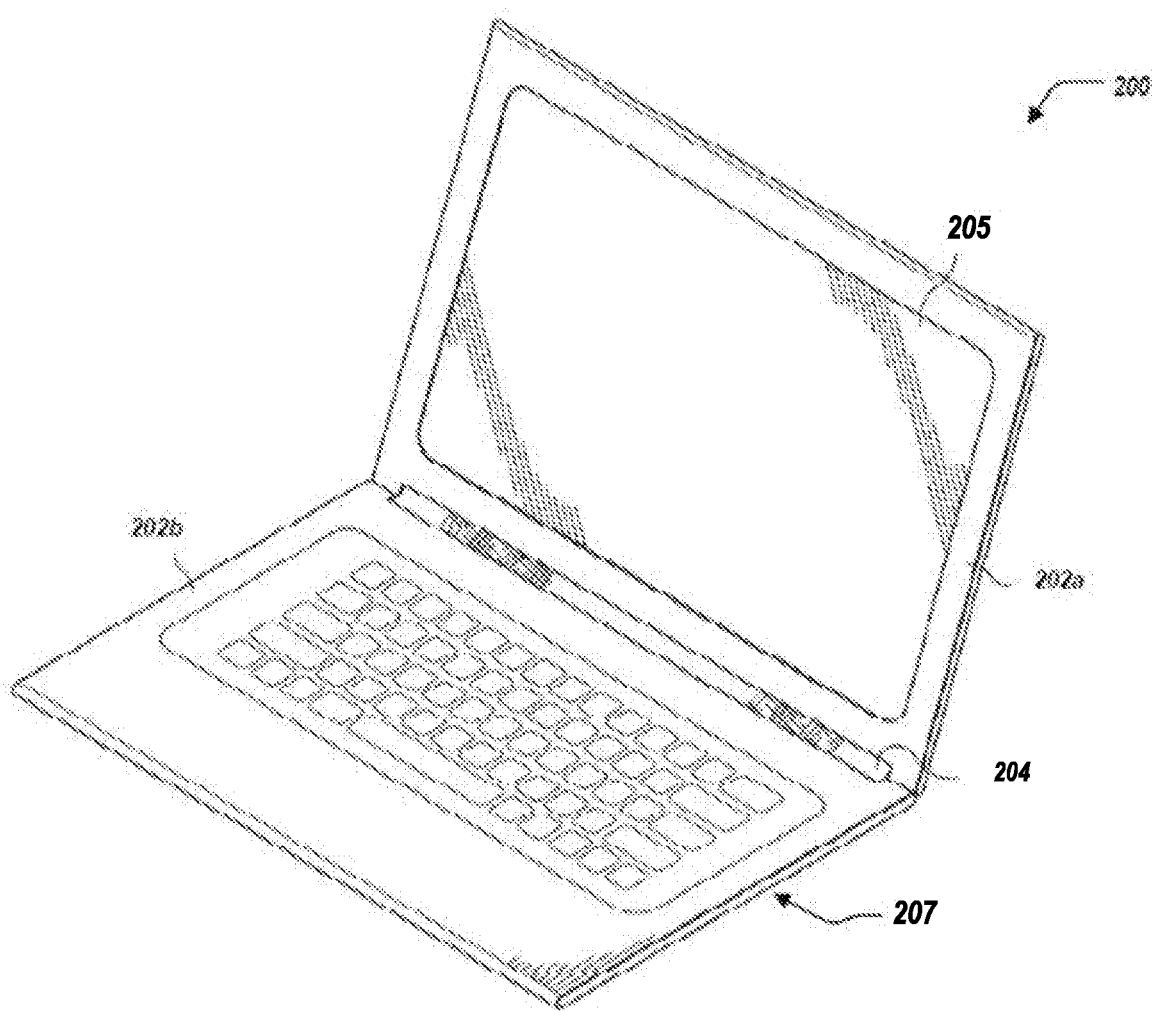
FIG. 2 illustrates a dual-body information handling system.

Turning now to FIG. 2, FIG. 2 illustrates a dual-body (or two-body) information handling system 200. The dual-body information handling system 200 can include a first body 202a and a second body 202b (collectively referred to as bodies 202). The information handling system 200 can be similar to the information handling system 100 of FIG. 1. In some examples, the first body 202a can include a display 205 and the second body 202b can include a keyboard 207 (and typically also include computing components). In some examples, each of the bodies 202 can include a display.

The information handling system 200 can further include a hinge 204 that couples the bodies 202 together and provides movement between the bodies 202, described further herein.

Figure 3:
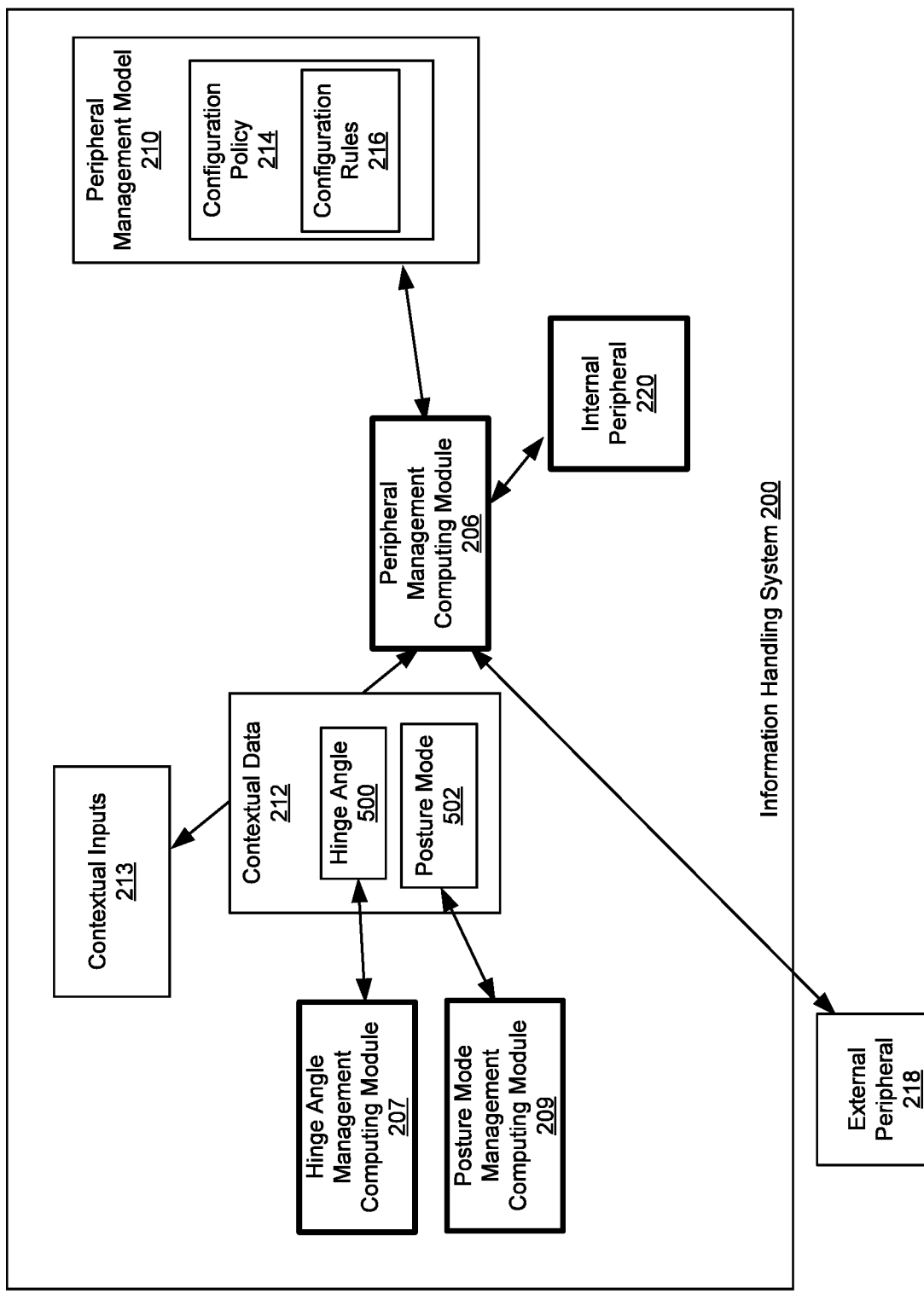
FIG. 3 illustrates a block diagram of the information handling system for managing peripherals of the dual-body information handling system.

Turning to FIG. 3, FIG. 3 illustrates a computing environment 201 including the dual-body information handling system 200. The dual-body information handling system 200 can be in communication with an external peripheral 218. The information handling system 200 can include a peripheral management computing module 206, a hinge angle management computing module 207, a posture mode management computing module 209, and an internal peripheral 220. The peripheral management computing module 206 can be in communication with the internal peripheral 220 and the external peripheral 218. In some examples, the dual-body information handling system 200 is similar to, or includes, the information handling system 100 of FIG. 1. In some examples, the internal peripheral 220 can include an on-screen keyboard, an integrated touchpad, and/or a digital touchpad. In some examples, the external peripheral 218 can include a wireless stylus, a printer, an external mouse, and/or an external keyboard.

In some embodiments, the peripheral management computing module 206 can perform, at a first time, a calibration and configuration of a peripheral management model 210. Specifically, performing of the calibration and the configuration of the peripheral management model 210 can include identifying contextual data 212 associated with contextual inputs 213 of the information handling system 202. Specifically, the contextual data 212 can include a hinge angle of the dual-body information handling system 200. That is, the hinge angle is an angle between the bodies 202 of the information handling system 200 as provided by the hinge 204. For example, the hinge angle can range between 0-360 degrees.

Figure 5:
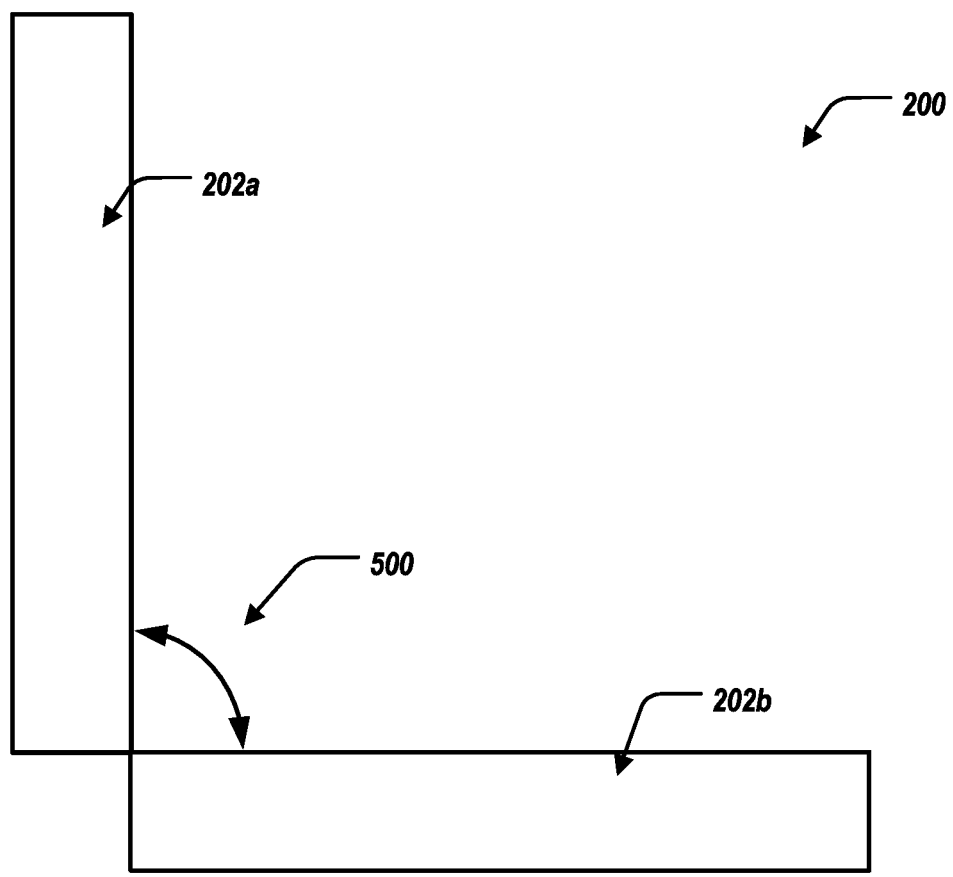
FIG. 5 illustrates the dual-body information handling system in a table-top posture mode.
Figure 6:
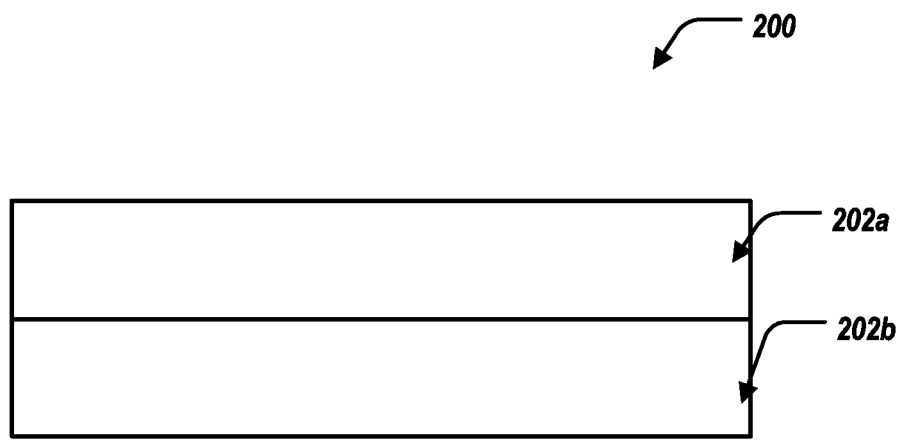
FIG. 6 illustrates the dual-body information handling system in a book posture mode.
Figure 7:
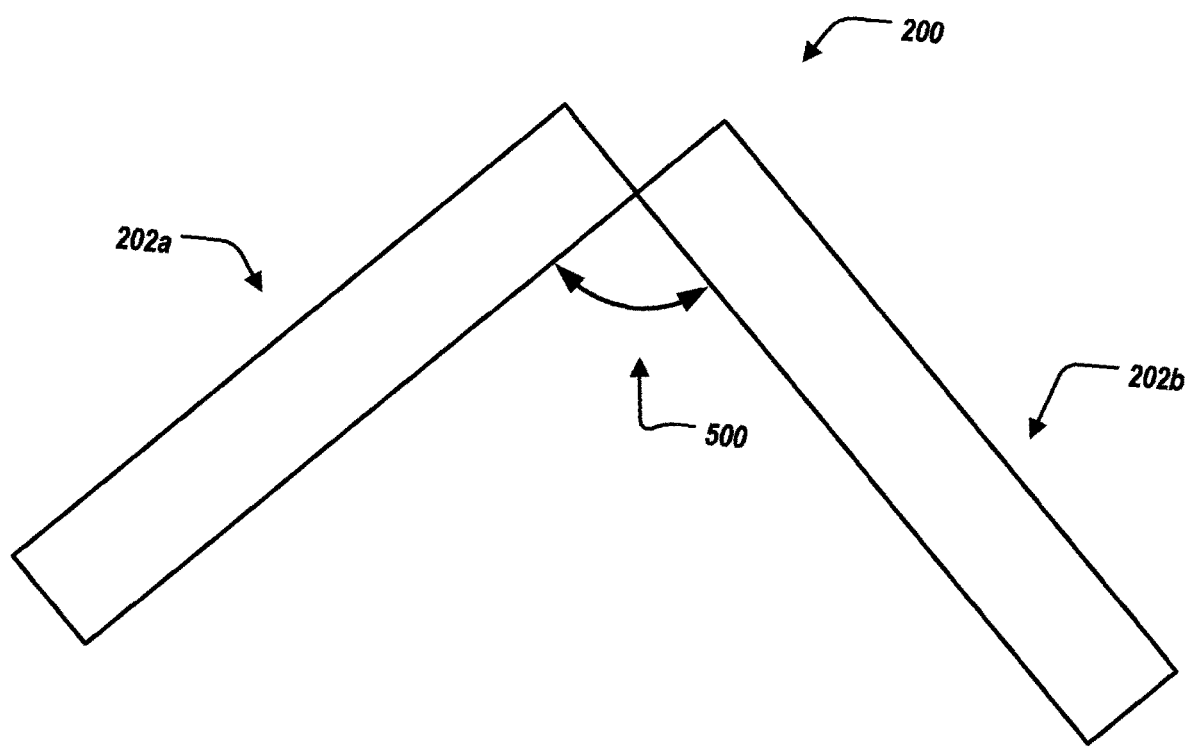
FIG. 7 illustrates the dual-body information handling system in a tent posture mode.

The hinge angle management computing module 207 can determine a hinge angle 500 between the bodies 202 of the information handling system 200. In some examples, the hinge angle management computing module 207 can determine the hinge angle 500 of the information handling system 200 based on a relative positioning of one of the bodies 202 with respect to the other body 202. In some examples, the hinge angle management computing module 207 can determine the relative positioning between the bodies 202 by measuring a distance between the bodies 202 at one or more locations, and/or determining a force applied by a hinge (not shown). For example, as illustrated in FIG. 5, the hinge angle management computing module 207 can determine that a hinge angle 500 that is defined between the bodies 202 of the information handling system 200 is 90 degrees (or approximately 90 degrees). As illustrated in FIG. 6, the hinge angle management computing module 207 can determine that the hinge angle 500 is approximately 0 degrees (or approximately 360 degrees) between the bodies 202. As illustrated in FIG. 7, the hinge angle management computing module 207 can determine that the hinge angle 500 is approximately 180 degrees between the bodies 202.

Referring back to FIG. 3, the contextual data 212 can further include a posture mode 502 of the dual-body information handling system 200. That is, the posture mode 502 of the dual-body information handling system 200 can include a table-top posture mode, a book posture mode, and a tent posture mode. The posture mode management computing module 209 can determine the posture mode 502 of the information handling system 200. In some examples, the posture mode management computing module 209 can determine the posture mode 502 of the information handling system 200 based on the hinge angle 500. For example, each of the posture modes can be associated with a hinge angle 500. For example, for a first degree range of the hinge angle 500, the posture module management computing module 209 can determine that the information handling system 200 is in the table-top posture mode; for a second degree range of the hinge angle 500, the posture module management computing module 209 can determine that the information handling system 200 is in the book top posture mode; and for a third degree range of the hinge angle 500, the posture module management computing module 209 can determine that the information handling system 200 is in the tent posture mode; each of the first, second, third degree ranges are non-overlapping. For example, the first degree range can be approximately 1-120 degrees; the second degree range can be approximately 0 or 360 degrees; and the third degree range can be approximately 120 degrees-359 degrees. Other degree ranges are also possible.

For example, as shown in FIG. 5, the posture mode computing module 209 can determine that the information handling system 200 is in the table-top posture mode as the hinge angle 500 is within the first degree range. As shown in FIG. 6, the posture mode computing module 209 can determine that the information handling system 200 is in the book posture mode as the hinge angle 500 is within the second degree range. As shown in FIG. 7, the posture mode computing module 209 can determine that the information handling system 200 is in the tent posture mode as the hinge angle 500 is within the third degree range.

The peripheral management computing module 206 can train, based on the contextual data 212, the peripheral management model 210. Specifically, the peripheral management computing module 206 can generate, based on the contextual data 212 identified at the first time, a configuration policy 214 that includes configuration rules 216. In some examples, the configuration rules 216 are rules for automatically performing computer-implemented actions for automatically adjusting settings of the internal peripheral 220 and/or the external peripheral 218 without user interaction.

To that end, the peripheral management computing module 206 can train the peripheral management model 210 to establish connections between the contextual data 212 and the configuration rules 216. Specifically, the peripheral management model 210 can identify one or more configurations rules 216 to be applied based on a connection with one or more of the contextual data 212.

In some examples, the peripheral management computing module 206 can train the peripheral management model 210 using a machine learning process, and/or a neural network. For example, the peripheral management computing module 206 can obtain contextual data 212 over a first time period, e.g., contextual data 212 such as the hinge angle 500 of the bodies 202 of the information handling system 200 and/or the posture mode 502 of the information handling system 200. Furthermore, the peripheral management computing module 206 can identify one or more parameters (or settings) of the information handling system 200 in response to the contextual data 212 of the information handling system 200. In other words, the peripheral management computing module 206 can identify parameters of the information handling system 200 when the information handling system is at a certain hinge angle and/or a certain posture mode. The peripheral management computing module 206 can then train the peripheral management model 210 based on such identified parameters (or settings) based on the contextual data 212 (e.g., using a machine learning process, and/or a neural network).

In some examples, the configuration rules 216 can include automatically adjusting one or more of a line width, an inking color, and a stylus friction of a wireless stylus as the external peripheral 218. In some examples, the configuration rules 216 can include automatically adjusting a key width, a key distance, a language, and interface elements of an on-screen keyboard as the internal peripheral 220. In some examples, the configuration rules 216 can include automatically adjusting a touch sensitivity, a scroll sensitivity, and a mapping of physical inputs of an integrated touchpad as the internal peripheral 220. In some examples, the configuration rules 216 can include automatically adjusting a touch sensitivity, a scroll sensitivity, and a mapping of digital inputs of a digital touchpad as the internal peripheral 220. In some examples, the configuration rules 216 can include automatically adjusting printer settings of a printer as the external peripheral 218. In some examples, the configuration rules 216 can include automatically adjusting a sensitivity, a scrolling speed, and a mapping of physical inputs of a computing mouse as the external peripheral 218. In some examples, the configuration rules 216 can include automatically adjusting a travel distance of keys, and a sensitivity of the keys of a physical keyboard as the external peripheral 218.

The peripheral focus computing module 206 can monitor the contextual inputs 213 of the information handling system 200. In some examples, the peripheral focus computing module 206 can monitor the contextual data 212 such as the hinge angle of the information handling system 200 and/or the posture mode of the information handling system 200.

In some implementations, the peripheral focus computing module 206 can, in response to monitoring the contextual inputs 213, access the peripheral focus model 210 including the configuration policy 214. The peripheral focus computing module 206 can further identify one or more of the configuration rules 216 based on the monitored contextual inputs 213. Furthermore, the peripheral focus computing module 206 can apply the configuration rules 216 to the information handling system 200. In other words, the peripheral focus computing module 206 can apply appropriate configuration rules 216 based on the monitored contextual inputs 213 as provided by the peripheral focus model 210. In some examples, the peripheral management computing module 206 can apply the configuration rules 216 to automatically adjust one or more settings of a peripheral of the dual-body information handling system 200 without user interaction.

For example, the peripheral management computing module 206 can monitor the contextual inputs 213 and determine that the contextual data 212 indicates that the information handling system 200 is in a particular posture mode (e.g., one of the table-top posture mode, the book posture mode, and the tent posture mode). Additionally, the peripheral management computing module 206 can monitor the contextual inputs 213 and determine that the contextual data 212 indicates a hinge angle of the information handling system 200 (e.g., between 0 and 360 degrees). In response, the peripheral management computing module 206 can access the peripheral management model 210, identify the configuration rules 216 that are applicable to determining the particular posture mode of the information handling system 200 and/or the hinge angle of the information handling system 200, and apply such configuration rules. For example, the peripheral computing module 206 can apply configuration rules 216 to automatically adjust one or more settings of a peripheral of the dual-body information handling system 200 without user interaction.

For example, when the external peripheral 218 includes a wireless stylus, the peripheral computing module 206 can apply the configuration rules 216 to automatically adjust a digital representation of the line width that corresponds to the wireless stylus, automatically adjust a digital representation of an inking color that corresponds to the wireless stylus, and/or a automatically adjust a digital representation of the friction of the wireless stylus. For example, when the internal peripheral 220 includes an on-screen keyboard, the peripheral computing module 206 can apply the configuration rules 216 to automatically adjust a digital representation of a key width of digital keys of the on-screen keyboard, automatically adjust a digital representation of a key distance of the digital keys of the on-screen keyboard, automatically adjust a language of the digital keys of the on-screen keyboard, and/or automatically adjust a digital representation of other interface elements of the on-screen keyboard.

For example, when the peripheral management computing module 206 monitors the contextual inputs 213 and determines that the contextual data 212 indicates that the information handling system 200 is in the table-top posture mode. In response, the peripheral management computing module 206 can access the peripheral management model 210, identify the configuration rules 216 that are applicable to determining the particular posture mode of the information handling system 200 is the table top posture mode, and apply such configuration rules related to the on-screen keyboard. For example, the peripheral computing module 206 can apply configuration rules 216 for the on-screen keyboard to automatically decrease a delay of the digital keys of the on-screen keyboard and increase a sensitivity of the digital keys of the on-screen keyboard.

For example, when the peripheral management computing module 206 monitors the contextual inputs 213 and determines that the contextual data 212 indicates that the information handling system 200 is in the tent posture mode. In response, the peripheral management computing module 206 can access the peripheral management model 210, identify the configuration rules 216 that are applicable to determining the particular posture mode of the information handling system 200 is the tent posture mode, and apply such configuration rules related to the on-screen keyboard. For example, the peripheral computing module 206 can apply configuration rules 216 for the on-screen keyboard to automatically decrease a sensitivity of the digital keys of the on-screen keyboard.

For example, when the internal peripheral 220 includes an integrated touchpad, the peripheral computing module 206 can apply the configuration rules 216 to automatically adjust a touch sensitivity of the integrated touchpad, automatically adjust a scroll sensitivity of the integrated touchpad, and automatically map physical inputs of the integrated touchpad. For example, when the internal peripheral 220 includes a digital touchpad, the peripheral computing module 206 can apply the configuration rules 216 to automatically adjust a touch sensitivity of the digital touchpad, automatically adjust a scroll sensitivity of the digital touchpad, and automatically map physical inputs of the digital touchpad. For example, when the external peripheral 218 includes a printer, the peripheral computing module 206 can apply the configuration rules 216 to automatically adjust printer settings of the printer, such as single-sided printing, dual-sided printing, zoom settings, and page layout settings. For example, when the external peripheral 218 includes an external mouse, the peripheral computing module 206 can apply the configuration rules 216 to automatically adjust a sensitivity of the mouse, automatically adjust a scroll sensitivity of the external mouse, and automatically map physical inputs of the external mouse. For example, when the external peripheral 218 includes an external keyboard, the peripheral computing module 206 can apply the configuration rules to automatically adjust a travel distance of a key of the external keyboard, and/or automatically adjust a sensitivity of the keys of the external keyboard.

Figure 4:
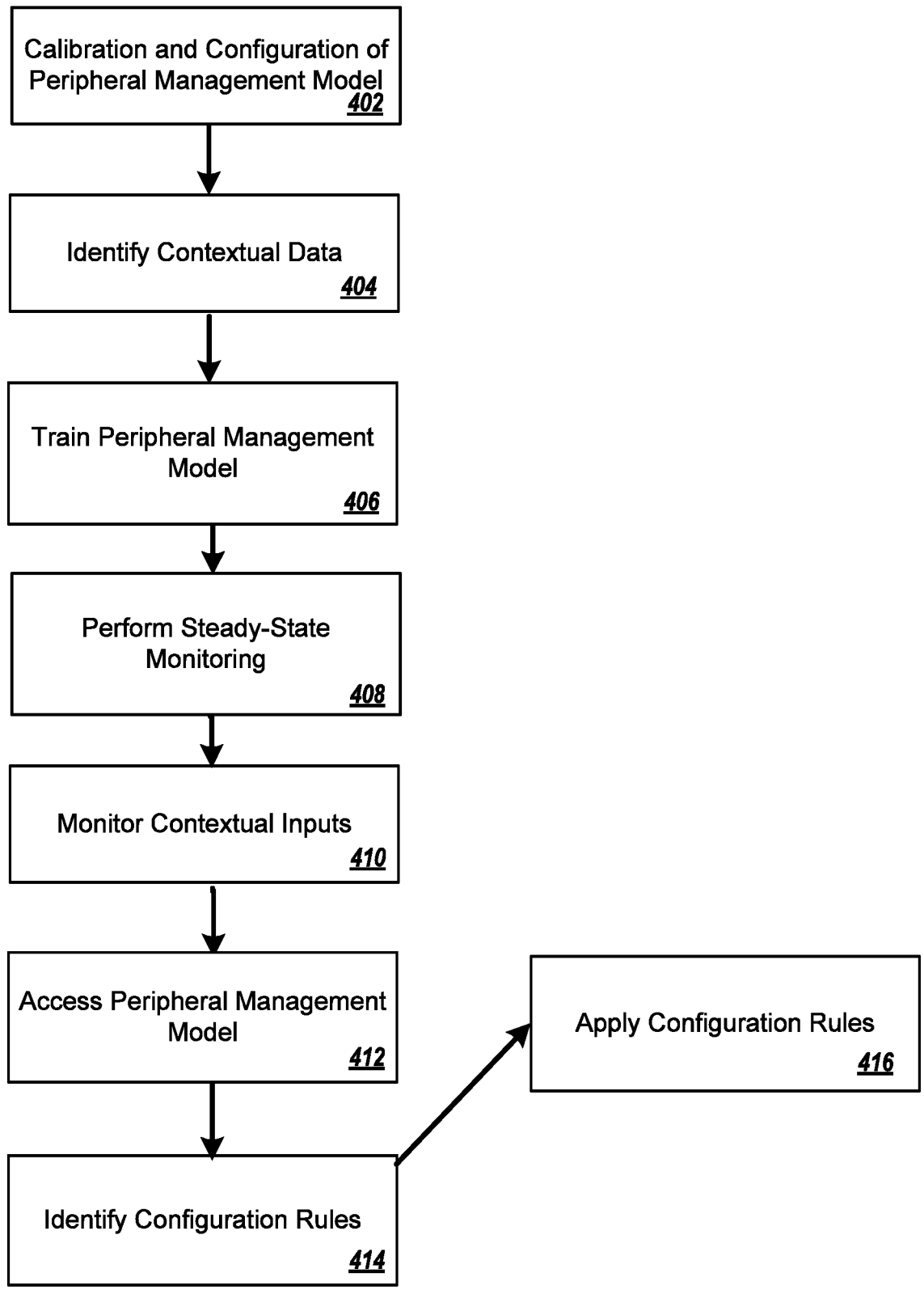
FIG. 4 illustrates a method for managing peripherals of the dual-body information handling system.

FIG. 4 illustrates a flowchart depicting selected elements of an embodiment of a method 400 for managing peripherals of a dual-body information handling system. The method 400 may be performed by the information handling system 100, the computing environment 200, the dual-body information handling system 200, and/or the peripheral management computing module 206, and with reference to FIGS. 1-3 and 5-7. It is noted that certain operations described in method 400 may be optional or may be rearranged in different embodiments.

The peripheral management computing module 206 can perform, at a first time, a calibration and configuration of the peripheral management model 210 (402). The peripheral management computing module 206 can identify contextual data 212 associated with the contextual inputs 213 of the information handling system 200 (404). In some examples, the contextual data 212 can include such contextual data such as a hinge angle of the dual-body information handling system 200; and a posture mode of the dual-body information handling system 200. The peripheral management computing module 206 can train, based on the contextual data 212, the peripheral management model 210 (406). In some examples, the peripheral management computing module 206 can generate, based on the contextual data 212 identified at the first time, a configuration policy 214 that includes configuration rules 216. In some examples, the configuration rules 216 are rules for automatically performing computer-implemented actions for adjusting one or more settings of the internal peripheral 218 and/or the external peripheral 220 of the dual-body information handling system 200 without user interaction.

The peripheral management computing module 206 can perform, at a second time after the first time, a steady-state monitoring of the information handling system 200 (408). The peripheral management computing module 206 can monitor the contextual inputs 213 of the information handling system 200 (410). The peripheral management computing module 206 can, in response to monitoring the contextual inputs 213, access the peripheral management model 210 including the configuration policy 214 (412). The peripheral management computing module 206 can further identify one or more of the configuration rules 216 based on the monitored contextual inputs 213 (414). The peripheral management computing module 206 can apply the configuration rules 206 to the information handling system 200 (416). In some examples, the peripheral management computing module 206 can apply configuration rules 216 to automatically perform computer-implemented actions for adjusting one or more settings of the internal peripheral 218 and/or the external peripheral 220 of the dual-body information handling system 200 without user interaction.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method for managing peripherals of a dual-body information handling system, comprising:
   performing, at a first time, a calibration and configuration of a peripheral management model, including:
      identifying contextual data including i) a hinge angle of the dual-body information handling system and ii) a posture mode of the dual-body information handling system;
      training, based on the contextual data, the peripheral management model, including generating a configuration policy including configuration rules, the configuration rules for performing computer-implemented actions to automatically adjust one or more settings of an on-screen keyboard connected to the dual-body information handling system without user interaction;
   performing, at a second time, a steady-state monitoring of the dual-body information handling system, including:
      monitoring i) the hinge angle and ii) the posture mode of the dual-body information handling system;
      determining, based on the monitoring, that the dual-body information handling system is in a table-top posture mode; and
      in response to the dual-body information handling system being in the table-top posture mode, i) accessing the peripheral management model including the configuration policy, ii) identifying one or more of the configuration rules based on the table-top posture mode, and iii) applying the one or more configuration rules to automatically a) decrease a delay of digital representations of keys of the on-screen keyboard and b) increase a sensitivity of the digital representation of keys of the on-screen keyboard without user interaction.

2. The computer-implemented method of claim 1, wherein identifying the contextual data includes identifying the posture mode of the dual-body information handling system from the table-top posture mode, a book posture mode, and a tent posture mode.

3. A dual-body information handling system, comprising:
   a peripheral;
   a memory media storing instructions;
   a processor in communication with the memory media to execute the instructions to perform operations comprising:
      performing, at a first time, a calibration and configuration of a peripheral management model, including:
         identifying contextual data including i) a hinge angle of the dual-body information handling system and ii) a posture mode of the dual-body information handling system;
         training, based on the contextual data, the peripheral management model, including generating a configuration policy including configuration rules, the configuration rules for performing computer-implemented actions to automatically adjust one or more settings of an on-screen keyboard connected to the dual-body information handling system without user interaction;
      performing, at a second time, a steady-state monitoring of the dual-body information handling system, including:
         monitoring i) the hinge angle and ii) the posture mode of the dual-body information handling system;
         determining, based on the monitoring, that the dual-body information handling system is in a table-top posture mode; and
         in response to the dual-body information handling system being in the table-top posture mode, i) accessing the peripheral management model including the configuration policy, ii) identifying one or more of the configuration rules based on the table-top posture mode, and iii) applying the one or more configuration rules to automatically a) decrease a delay of digital representations of keys of the on-screen keyboard and b) increase a sensitivity of the digital representation of keys of the on-screen keyboard without user interaction.

4. The information handling system of claim 3, wherein identifying the contextual data includes identifying the posture mode of the dual-body information handling system from the table-top posture mode, a book posture mode, and a tent posture mode.

5. A non-transitory computer-readable medium storing software comprising instructions executable by one or more computers which, upon such execution, cause the one or more computers to perform operations comprising:
performing, at a first time, a calibration and configuration of a peripheral management model, including:
identifying contextual data including i) a hinge angle of a dual-body information handling system and ii) a posture mode of the dual-body information handling system;
training, based on the contextual data, the peripheral management model, including generating a configuration policy including configuration rules, the configuration rules for performing computer-implemented actions to automatically adjust one or more settings of an on-screen keyboard connected to the dual-body information handling system without user interaction;
performing, at a second time, a steady-state monitoring of the dual-body information handling system, including:
monitoring i) the hinge angle and ii) the posture mode of the dual-body information handling system;
determining, based on the monitoring, that the dual-body information handling system is in a table-top posture mode; and
in response to the dual-body information handling system being in the table-top posture mode, i) accessing the peripheral management model including the configuration policy, ii) identifying one or more of the configuration rules based on the table-top posture mode, and iii) applying the one or more configuration rules to automatically a) decrease a delay of digital representations of keys of the on-screen keyboard and b) increase a sensitivity of the digital representation of keys of the on-screen keyboard without user interaction.

6. The computer-readable medium of claim 5, wherein identifying the contextual data includes identifying the posture mode of the dual-body information handling system from the table-top posture mode, a book posture mode, and a tent posture mode.

7. The computer-implemented method of claim 1, further comprising:
performing, at a third time, the steady-state monitoring of the dual-body information handling system, including:
monitoring i) the hinge angle and ii) the posture mode of the dual-body information handling system;
determining, based on the monitoring, that the dual-body information handling system is in a tent posture mode; and
in response to the dual-body information handling system being in the tent posture mode, i) accessing the peripheral management model including the configuration policy, ii) identifying one or more of the configuration rules based on the tent posture mode, and iii) applying the one or more configuration rules to perform one or more of the computer-implemented actions to automatically decrease the sensitivity of the digital representation of keys of the on-screen keyboard without user interaction.

8. The information handling system of claim 3, the operations further comprising:
performing, at a third time, the steady-state monitoring of the dual-body information handling system, including:
monitoring i) the hinge angle and ii) the posture mode of the dual-body information handling system;
determining, based on the monitoring, that the dual-body information handling system is in a tent posture mode; and
in response to the dual-body information handling system being in the tent posture mode, i) accessing the peripheral management model including the configuration policy, ii) identifying one or more of the configuration rules based on the tent posture mode, and iii) applying the one or more configuration rules to perform one or more of the computer-implemented actions to automatically decrease the sensitivity of the digital representation of keys of the on-screen keyboard without user interaction.

9. The computer-readable medium of claim 5, the operations further comprising:
performing, at a third time, the steady-state monitoring of the dual-body information handling system, including:
monitoring i) the hinge angle and ii) the posture mode of the dual-body information handling system;
determining, based on the monitoring, that the dual-body information handling system is in a tent posture mode; and
in response to the dual-body information handling system being in the tent posture mode, i) accessing the peripheral management model including the configuration policy, ii) identifying one or more of the configuration rules based on the tent posture mode, and iii) applying the one or more configuration rules to perform one or more of the computer-implemented actions to automatically decrease the sensitivity of the digital representation of keys of the on-screen keyboard without user interaction.

* * * * *